Jan. 4, 1927.
H. W. HILL
OPHTHALMIC LENS
Filed Jan. 10, 1925
1,613,276
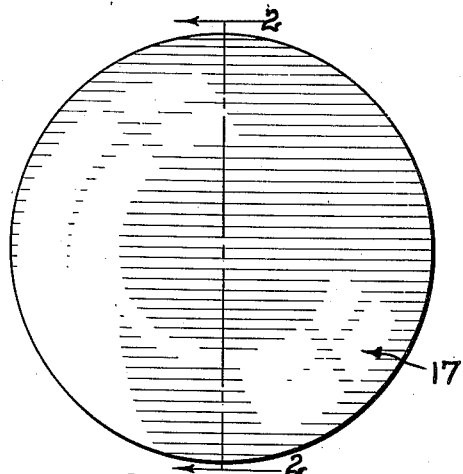
Fig. 1.
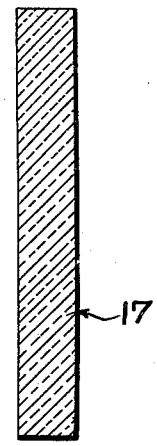
Fig. 2.
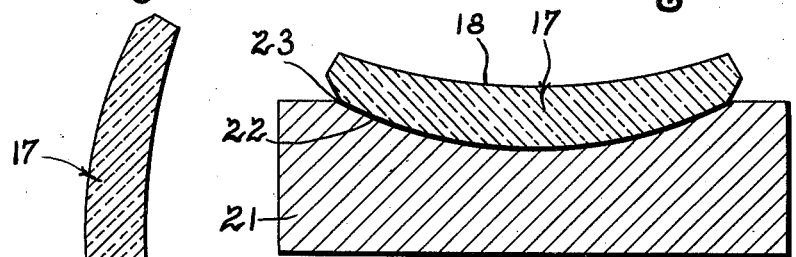
Fig. 4.
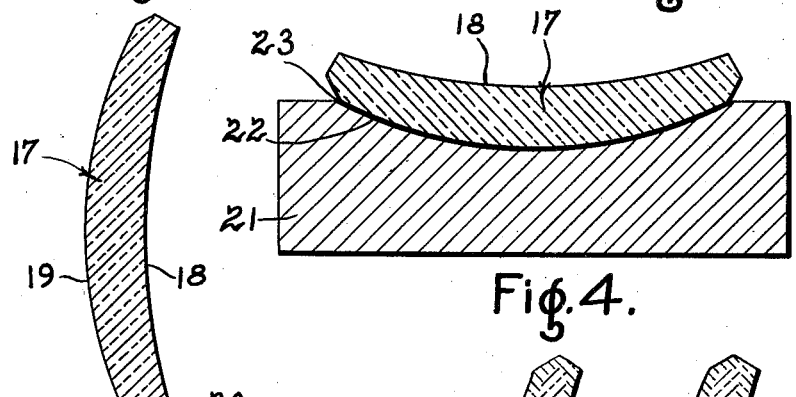
Fig. 3.
Fig. 6.
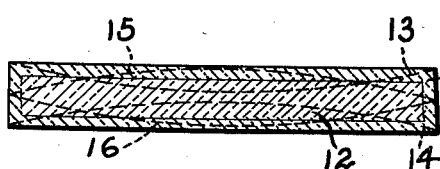
Fig. 7.
Fig. 5.
INVENTOR
Harry W. Hill.
BY
Harry H. Styll.
ATTORNEY Patented Jan. 4, 1927.

1,613,276

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed January 10, 1925. Serial No. 1,617.

My invention relates to new and useful improvements in ophthalmic lenses and has particular reference to a hardened ophthalmic lens, blanks from which the same may be produced, and to a process for producing either the blanks or the lens.

It is a most important object of my invention to provide an ophthalmic lens ground to correct the vision of the wearer, in addition to being hardened, whereby it becomes particularly applicable for use in goggles or under any condition in which protection lenses are ordinarily used.

Another important object of my invention is the provision of a tempered lens blank, which may be produced in a factory engaged in the production of ophthalmic lenses, and sold to retailing opticians, who in turn may grind the same in accordance with any prescription which they might receive, to form hardened lenses of any power desired.

My invention further contemplates the provision of a process by which may be formed tempered lens blanks, having power curves formed on its surfaces sufficiently similar to the power curves of the lenses to be produced to permit of the grinding of the same to the desired finish without exposing the untempered glass.

And again, my invention contemplates the provision of a process by which hardened ophthalmic lenses may be produced which shall be capable of correcting the errors in the vision of the wearer.

Further objects and advantages of my invention shall become apparent during the course of the following description, taken in connection with the accompanying drawings, wherein like numerals are used to designate corresponding parts throughout all views of the same, and in which, Figure 1 is a front elevation of a lens blank used in my process, Figure 2 is a transverse sectional view taken on line 2—2 of Figure 1, Figure 3 is a transverse sectional view, similar to Figure 2, but illustrating the second step in my process, Figure 4 is a transverse sectional view, showing the lens blank seated on the surface retaining block, Figure 5 is a transverse sectional view, showing the completed lens blank, Figure 6 is a transverse sectional view, showing the completed lens, and Figure 7 is a diagrammatic view of a lens blank, illustrating certain difficulties heretofore encountered.

In the commercial use of protection lenses, and particularly in machine and similar shops, where it is customary for workmen to wear goggles to protect their eyes from flying chips and the like, there has ever been a demand for a protection lens capable of correcting the vision of the wearer. In so far as I am aware, it has in the past been necessary for a workman whose vision required the aid of correction lenses, to either wear his correction lenses in addition to his protection goggle, or else to forego the use of the protection goggles and rely on the slight protection offered him by his ordinary correction glasses. It is therefore a most important object of my invention to provide an ophthalmic lens which is hardened to withstand the usage ordinarily given protection lenses, and yet a lens which may be formed with the necessary power to correct the wearer's vision. A lens produced according to my invention may be formed with any power desired, and used in goggles or under any conditions in which protection lenses are ordinarily used, thus giving the workman advantages of a single lens combined with his required correction.

Prior to my invention, there have been a number of attempts to produce a hardened ophthalmic lens, on which might be ground the necessary curves to give the lenses the desired power. Chief among these attempts was that of first grinding the lens to the power desired, and of subsequently tempering the same. This process, however, failed badly, in that during the tempering process the lenses were invariably either warped entirely out of shape, or else so badly scarred on the surface that it was impossible to see through them.

Another process which was tested in a number of different ways was that of attempting to first temper a blank and subsequently form on that blank the desired power curves. Relative to this process there arose a number of difficulties, which I can describe completely by referring to Figure 7 of the drawing, wherein I have diagrammatically shown the lens blank, assumed to be tempered, and on which it is desired to grind power curves. Referring then particularly to Figure 7 of the drawing, the numeral 10 designates a lens blank, the same having been hardened by the usual tempering process. It is assumed by chemists and others particularly interested in the art of tempering blanks, that the tempering process merely produces on the surface of the lens a layer of hardened glass. Working therefore on this principle, I have shown on the lens blank 10 an outer layer 11, which is intended to represent the hardened or tempered glass, and an inner core 12, which is intended to represent the ordinary or untempered glass. It is obvious that in grinding a lens from a blank thus tempered the resistance of the surface of the completed lens would be weakened in proportion as that surface approched the core 12, or the untempered portion of the blank. In other words it may be clearly seen from the drawing that should it be desired to form on the blank a pair of minus curves, such as 13 and 14 respectively, the resistance of the finished lens would be greatest at its outer edge and substantially zero at its middle point. While this holds true in theory, it has further been found in practice, that should a blank tampered as is this blank, be ground as suggested by the curves 13 and 14 there would be a tension set up between the area of greatest resistance and that of least resistance such that the lens would become cracked and broken from the internal strain.

If on the other hand it would be desired to form on the blank a pair of positive curves, such as 15 and 16 respectively, similar difficulties would be experienced, in that the finished lens would be strongest at its mid point, and weakest at its periphery. Likewise, it may be seen that a combination of curves, such as a plus on one side and a minus on the other, would not only tend to form points on the finished lens of no resistance whatever, but also tend to set up internal strain which would ultimately break the lens. I consider, therefore, as a salient feature of my invention the elimination of the difficulties and disadvantages incident to those processes heretofore used for producing tempered correction lens.

My process consists in a plurality of consecutive steps, which are clearly illustrated in the drawing wherein I have traced my process from a lens blank 17 to the finished lens. In my process I take a lens blank 17, which is of the usual construction, and form thereon the surfaces 18 and 19 respectively, to give my blank the power which I desire in my finished lens. In forming the surfaces 18 and 19, I take care to leave the thickness of my lens substantially greater than the thickness I desire in my finished lens. Having formed my blank to a lens of the power I desire, and of an exaggerated thickness, I proceed to edge the lens as at 20, likewise taking care in this operation, to form the circumference of my lens slightly over size. Thus it may be seen that at this stage of my process I have produced a partially finished blank which in every way conforms to the finished lens which I intend to produce, save that it is slightly larger than that lens in every dimension.

Having thus formed my over size lens, I place the same on a carborundum block, such as 21, recessed as at 22, to receive the surface 19 of my lens. In practice I have found it advisable to form the blank 21 with a recess such as 22 to receive the lens seat as at 19, however, it is to be understood that at this stage of my process the block 21 may take any form in so far as that form is capable of receiving one surface of my blank. To more clearly illustrate this, it might be well to add that should my blank have formed on one side a plus 5 curve, I would form on the surface of my blank 21 a minus 5 curve, so that the two would fit closely together. Similarly should my blank be formed with a minus 5 curve on one surface and should I desire to place this surface down on my blank 21, I would form the blank 21 with a plus 5 curve so that it would fit with the curve of my lens blank. In use, I have also found it advisable to provide intermediate the lens and the blank a layer of mica or graphite such as 23 to prevent the adhering of the lens to the block.

Having thus positioned the blank on the block 21, I proceed to heat the two until the lens approaches plasticity at which time I plunge the heated lens into a vat of my tempering solution. I lay no claim to my tempering process per se in that it may be one of the many processes for tempering glass which have been known to the trade for a number of years, differing only in that the lens is heated while positioned on the block 21 whereby the surface of the lens is prevented from becoming badly warped or misshaped.

Were I to stop my process at this point, it is obvious that I would have produced a blank from which might be produced a hardened correction lens as shown in Figure 5 of the drawing. The numeral 24 designates the outside layer or tempered layer of my blank and the numeral 25 designates the inner core or uncovered portion of my blank and I reserve the right to stop my process at this point considering these blanks as completed and capable of being sold to retailing opticians to be finished by them.

Carrying my process, however, to the finished lens, I proceed to surface the blank to remove the roughened or warped outer surface. It may readily be seen that due to the thickness of the tempered layer of glass in my blank and also due to the similarity between the curves formed on my blank and the curves which I desire to have in my completed lens, I am able to remove a substantial amount of the surface of my blank without exposing the inner core or untempered part of my blank. Likewise, inasmuch as I have previously edged my blank within a fraction of the ultimate size which I desire, I am able to finish edging the same without approaching the inner or untempered core of my blank.

While I have shown broadly how I attain the objects of my invention I shall, for the sake of clearness, proceed to trace my process when the same is applied to a particular prescription. Supposing then, that I am in receipt of a prescription reading O. U. sphere plus 2.00; cylinder plus .75; axis 105; size 45.8 mm. To those skilled in the art, it is apparent from the above description that there must be produced a pair of lenses, each lens as indicated by the letters O. U., of which shall have formed a 2.00 diopter spherical surface power on one side and a .75 diopter cylindrical surface power on the other side whose axis is 105°. It is also obvious that the circumference of the finished lens must measure 45.8 mm. I proceed therefore to first form an oversized blank from which I shall be able to produce a finished lens conforming to the requirements above set forth.

While there is no set rule as to the thickness which I must leave at the center of my lens, I have found in practice that the most desirable thickness for my finished lens is 2.3 mm. and that in order to obtain this thickness in my finished lens I should form my blank with an excess thickness of .6 mm. I form the surface 19, therefore, with a plus 2.00 diopter spherical surface power taking care that the same is spaced from the surface 18 on which I form the plus .75 cylinder surface power by approximately 2.9 mm. or .6 mm. over the thickness I desire in the finished lens. Also in practice, I have found it advisable in edging my blank to edge the same about 1½ mm. over size, so that in order in this particular prescription to have a circumference of 45.8 mm. in my finished lens, I find it necessary to edge my blank at this step with a circumference of 47.3 mm. or 1½ mm. over the desired finished circumference.

At this point then in my process, I have formed a blank which is roughly of the power which I desire, while being sufficiently over size in every dimension to permit of the resurfacing of the same. In order, therefore, to temper this blank, I place the same on my block 21 on which I have formed a minus 2 diopter surface power curve 22 in which to receive the surface 19 or my blank. After positioning my blank on the block 21, I proceed to heat the two, as stated before, until the blank approaches a state of plasticity at which time I immerse the same in any suitable tempering liquid. Due to the fact that the block 21 has substantially preserved the surface of my blank and prevented the same from becoming warped, I am able to produce a tempered blank such as illustrated in Figure 5 having substantially the power which I desire, having a layer of tempered glass on its surfaces and capable of being finished to my completed lens with no danger of exposing the inner core or untempered part of the same.

Should I desire to finish this blank, I proceed to surface the same grinding the face 18 to a depth of approximately .3 mm. and the face 19 sufficiently to give me the thickness I desire in the finished lens. I have found that .3 of a mm. is sufficient to thoroughly cleanse, straighten and surface the face of my lens and give me a finished lens which is clear and perfect. Likewise, I proceed to edge the lens reducing the same from a circumference of 47.3 mm. to the circumference which I desire and which in this case is 45.8 mm.

From the foregoing it will be seen that I have produced a tempered lens having a spherical power of plus 2 diopter on one surface, a cylindrical power of plus .75 diopter on the other surface, axis 105 degrees and a lens of a circumference of 45.8 mm. as desired. It is obvious that even as I have traced this process thru with reference to this one prescription, the same may be equally applicable to any prescription which may be desired.

It is apparent, therefore, that I have produced a process by which I am able to form hardened lenses having corrective powers. It will also be seen that I have produced a blank on which may be ground curves required by the prescription in question to give the finished lens any power desired.

In addition, it may be seen that I have produced a hardened correction lens that may be used wherever protection lenses are desired and which will not only give the wearer the benefit of its corrective powers, but also safeguard the wearer equally as well as the usual plain glass protection lenses. The lens produced in accordance with my invention may be inserted in goggles and used without descrimination in that it requires no auxiliary lens to aid it in the performance of its duty.

While I have shown and described but one general process, one type of blank, and one example of a finished lens, it is to be understood that I reserve the right to make certain minor departures from the disclosure, in so far as I remain within the spirit of my invention and the scope of the appended claims.

While I have shown and described the process of making hardened ophthalmic lenses in which the lens surfaces have been made substantially exactly the same in the rough state as they are to be in the finished lens, it will be understood that these surfaces do not have to be made absolutely identical with the finally finished surfaces required, but only approximately so, the object being that the rough surfaces shall so nearly approach the finished surfaces that the layer of hardened material will not be destroyed or cut through by making the finished lens.

Having thus described my invention, what I claim is:

1. A tempered blank for producing a hardened ophthalmic lens of a given power having tempered surface layers and an untempered central portion, and having formed on its tempered surfaces curves substantially parallel with the required curves for the finished lens and at a greater distance from the center of the lens than the required curves whereby the required curves may be finished from the blank without exposing the untempered central portion.

2. A tempered blank for producing a hardened ophthalmic lens of a given power having a tempered surface layer and an untempered portion beneath the surface layer and having formed on its tempered surface a curve substantially parallel with the required curve for the finished lens and at a greater distance from the center of the lens than the required curve, whereby the required curve may be finished from the blank without exposing the untempered portion beneath the tempered layer.

3. A tempered blank for producing a hardened ophthalmic lens of a given power, having formed on its surfaces, faces parallel to and spaced by $\tfrac{3}{10}$ mm. from the faces ultimately desired, whereby the finished lens may be formed without exposing the untempered glass.

4. The process of producing a hardened ophthalmic lens of any given power, which consists in forming a lens to the power desired having a thickness exceeding the ultimate thickness desired by $\tfrac{6}{10}$ mm. edging the same to a circumference exceeding the ultimate circumference desired by 1½ mm., tempering the lens thus formed and subsequently finishing the same to the power and size desired.

5. The process of forming a blank for a hardened ophthalmic lens of a given power which consists in forming a surface of the blank with a curve substantially parallel with the finished curve required and at a greater distance from the center of the lens than the finished curve, and tempering the formed surface.

6. The process of forming a hardened ophthalmic lens of a given power which consists in forming a blank with surface curves parallel to the curves required with an excess thickness over the thickness required for the finished lens, heating the blank, emersing the heated blank in a tempering liquid, and finishing the surfaces to an optical surface parallel with the original surfaces to the thickness required without cutting through the hardened surfaces of the blank.

HARRY W. HILL.